United States Patent [19]

Poupin

[11] 3,777,166

[45] Dec. 4, 1973

[54] CONTROL DEVICE FOR A MARK ON A CONTINUOUSLY MOVING BAND

[75] Inventor: Raymond Poupin, Fleury-les-Aubrais, France

[73] Assignee: Service D'Exploitation Industrielle Des Tabacs Et Des Allumettes, Paris, France

[22] Filed: Sept. 15, 1972

[21] Appl. No.: 289,331

Related U.S. Application Data

[63] Continuation of Ser. No. 5,724, Jan. 26, 1970, abandoned, which is a continuation-in-part of Ser. No. 571,871, Aug. 11, 1966, abandoned.

[52] U.S. Cl. .......................... 250/219 DR, 250/219 D
[51] Int. Cl. ............................................ G01n 21/30
[58] Field of Search .................. 250/219 DR, 219 D, 250/219 DF, 219 F, 219 DE, 219 DQ, 221, 222, 223; 235/61.11 E; 209/111.7

[56] References Cited

UNITED STATES PATENTS

| | | | |
|---|---|---|---|
| 2,883,559 | 4/1959 | Bailey | 250/219 DR |
| 3,439,176 | 4/1969 | Astley | 250/219 DR |
| 2,583,580 | 1/1952 | Ludwig | 250/219 F |
| 2,840,722 | 6/1958 | Frommer | 250/219 DR |

*Primary Examiner*—James W. Lawrence
*Assistant Examiner*—D. C. Nelms
*Attorney*—Jacobs and Jacobs

[57] ABSTRACT

An arrangement for monitoring the presence, quality and location of markings on a moving band. Two photo-sensitive detectors are directed onto the moving band and provide a signal when a mark on the band passes beneath one of the detectors. The signal from the photosensitive detectors is processed for amplitude and frequency of occurrence. The amplitude processing determines whether the mark is of the desired quality and printed intensity, whereas proper location and spacing of the marking is determined from the pulse repetition frequency derived from the photosensitive detectors. A comparator monitors the pulse repetition frequency by comparing the pulse signal from the photosensitive detector with the pulse signal realized from a reference source.

1 Claim, 7 Drawing Figures

PATENTED DEC 4 1973

3,777,166

SHEET 1 OF 3

INVENTOR
Raymond Poupin
By
Sparrow and Sparrow
ATTORNEYS

INVENTOR
Raymond Poupin
By Sparrow and Sparrow
ATTORNEYS

INVENTOR
Raymond Poupin
By Sparrow and Sparrow
ATTORNEYS

CONTROL DEVICE FOR A MARK ON A CONTINUOUSLY MOVING BAND

This application is a continuation of Ser. No. 5,724, filed Jan. 26, 1970, which in turn is a continuation-in-part of copending application Ser. No. 571,871 filed Aug. 11, 1966 both now abandoned.

BACKGROUND OF THE INVENTION

The present invention relates to a monitoring device which monitors or checks a continuously moving band of material for the proper quality and location of markings on the band. The markings on the band must, for frequent applications, be accurately positioned in transverse and/or longitudinal directions. The mark on the band may have to be monitored for both the depth of the impression and its homogeneity. The presence of the mark, in the first place, may also be a requirement in the monitoring process. When the monitoring arrangement detects faulty characteristics in the markings on the band, the associated machine which applies the markings to the band may be immediately stopped from further operation. It is also possible to stop such machine operation after a predetermined interval or delay if the faulty characteristic does not call for immediate discontinuance of operation. The monitoring or checking arrangement, moreover, may be designed and mounted so that upon detection of a particular fault or deflect in the markings, such as improper positioning of the markings, automatic correction is carried out in one or another direction to eliminate the error.

Accordingly, it is an object of the present invention to provide an arrangement for monitoring and checking the quality, the presence, and the positions of a marking which has to be printed, for example, at regular intervals on a band of material moving continuously on a processing machine. The present invention achieves this object by providing a monitoring device with at least two photosensitive elements arranged to receive simultaneously light transmitted or reflected from the band. One photosensitive element is directed onto the region of the band carrying the markings, whereas the other photosensitive element is directed onto the region of the band outside the region in which the markings occur. A differential device or circuit compares the levels of the signals derived from the two photosensitive elements.

The photosensitive elements may be in the form of photoelectric cells which become actuated when a marking occurs within the path of the light beam. By performing a level comparison through a threshold detector, for example, the machine for printing the markings may be stopped from further operation when a defect in the intensity of the marking or in the placement of the marking is detected.

The sensing or detection device may be constituted of a single light source operating in conjunction with a group of coupled photoelectric cells toward which light from the source is projected. Suitable optical lenses may be used to focus a light beam which defines a spot on the moving band and traces the form of the marking. The spot generated by the light beam may be slightly less in size than that of the mark on the band, in the direction of the band width: In the direction of the movement of the band, however, the spot should be at least equal in size to the marking.

The pickup or detection device may possess a single light source functioning in cooperation with at least two groups of coupled photoelectric cells. Through suitable oriented lenses, one light beam is formed to define a spot which traces the form of the marking on the moving band. Another light beam may be used to define spots arranged along the outer border or edge of the band.

The photoelectric cells are actuated through light beams which are either reflected or transmitted with respect to the band. The band is maintained in a stable transverse location by a guide in the plane of movement, and the photoelectric cells have their detection or interception surfaces located in the same plane. Whereas one group of photoelectric cells is directed along the zone or region containing the markings on the band, the other group of cells is directed to the zone outside of this region containing the markings. The signals or pulses derived from the two groups of cells may be transmitted to a threshold detector after suitable amplification. The resulting pulses derived from the two groups of cells may be passed through wave shaping circuits and then compared with a reference signal in the form of a rectangular-shaped pulse signal which is derived from a generator synchronized with the general controls of the machine. When a pluse derived from the photosensitive detector exceeds a predetermined threshold level, the machine may be stopped after a predetermined delay, unless manual intervention taken place.

It is also possible to monitor the pulse signals from the photosensitive device for phase or pulse repetition frequency, and thereby determine the correctness of the spacing and positioning and markings on the moving band.

In a preferred embodiment of the present invention, the pick-up or detection device consists of two groups of photoelectric cells connected to a differential circuit. One group of cells is directed onto the region of the moving band carrying the printed markings, whereas the other group of cells is directed outside of this region. When no marking is present, both groups of cells are illuminated with equal light intensity. When a single light source is used in conjunction with the phtotelectric cells, the light therefrom is divided into two beams — each directed towards one of the groups of cells. The light beams are directed through either transmission through the band or reflection from the band.

In a preferred arrangement, the distance between the two groups or rows of cells is only slightly greater than the dimension of the printed marking in the direction of motion of the band. In the present invention, the photosensitive elements may be in the form of photosensitive resistors, and the axes of the photosensitive elements may be arranged substantially parallel to the plane of the continuously moving band containing the markings.

The axis of the filaments of the light source may be arranged parallel to the axis of the photosensitive cells, and the optical system may include two symmetrical cylindrical lenses with axes parallel to the axis of the filament.

Heat filters may be interposed between the light source and the cells, when deemed necessary, and the photosensitive resistors of the detection device may be connected in the branches of a suitably balanced Wheatstone bridge.

SUMMARY OF THE INVENTION

An arrangement for the monitoring and checking of markings printed upon a continuously moving band of material. Photoelectric cells arranged in two groups are directed onto the band in the region containing the markings and outside of the region. A differential amplifier connected to the photosensitive cells emits a pulse signal whenever a marking appears beneath one of the cell groups. The resulting pulse signal from the differential amplifier is analyzed for amplitude as well as phase or repetition frequency. From such analysis, the quality, presence and location of the marking may be examined and checked. When the amplitude and/or repetition frequency of the pulses derived from the photosensitive cells lie outside of prescribed limits, the machine for producing the marking on the band may be stopped from further operation.

BRIEF DESCRIPTION OF THE DRAWINGS

In the following description and in the claims, parts will be identified by specific names for convenience but such names are intended to be as generic in their application to similar parts as the art will permit. Like reference characters denote like parts in the several figures of the drawing, in which

DESCRIPTION OF THE PREFERRED EMBODIMENTS

Figure 1:
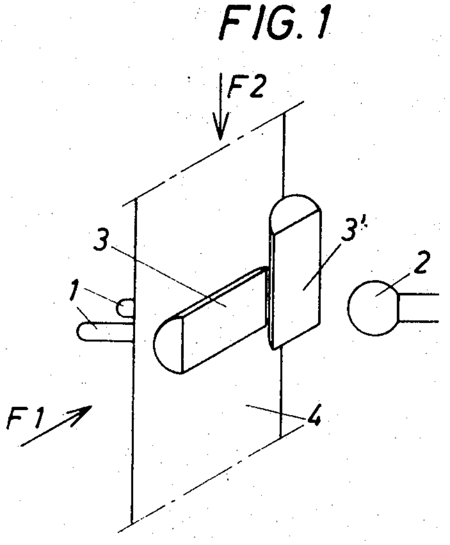
FIG. 1 is a schematic view in perspective of one embodiment of the invention with a cell for checking the mark and a cell for checking the reading of the band.
Figure 2:
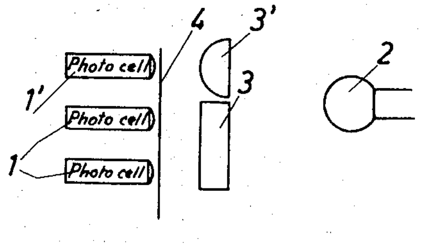
FIGS. 2 and 3 are views of the embodiment of FIG. 1 respectively along the arrows $F_2$ and $F_1$ of this figure.
Figure 3:
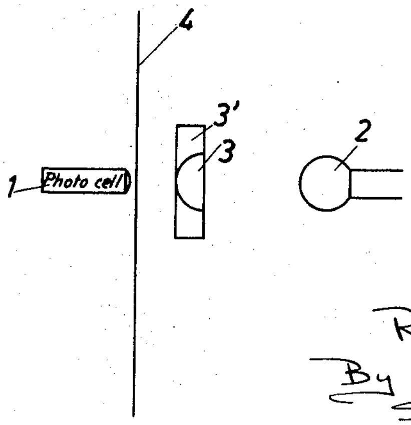

Referring to the drawings, FIGS. 1 – 3 show the arrangement of a photosensitive pick-up system in which photoelectric detectors 1 and 1' receive light from a source 2 after transmission through lenses 3 and 3' as well as the moving bank 4. The longitudinal and transverse directions of the band are designated by F2 and F1, respectively. The lens 3 is oriented along the width of the band, whereas the lens 3' is situated along the edge of the band. Accordingly, the lens 3 is located within the region of the markings on the band, whereas the lens 3' lies outside of this region.

When marking on the band is not present within the light path through the lens 3, identical signals are received by the photosensitive devices 1 and 1'. When, however, markings do appear in the path of light through the lens 3, light directed onto the cells 1 becomes interrupted and, as a result, a difference in signals prevails between the cells 1 and 1'. When the cells 1 and 1' are, consequently, connected to a differential amplifier, an impulse, that is a pulse signal may be realized which signifies the presence of a marking passing across the lens 3 or the cells 1.

Figure 4:
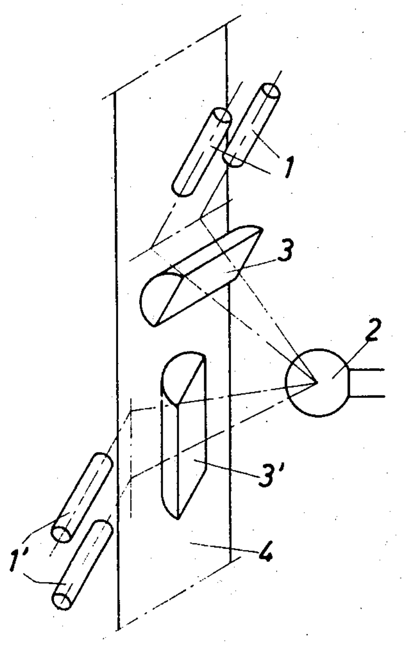
FIG. 4 is a perspective view of a variation of the embodiment of FIGS. 1 to 3.

In the embodiment of FIG. 4, photosensitive devices 1 and 1' are arranged to monitor the markings on the band and the border or edge of the band; respectively. Thus, photo cells 1 are directed against regions on the band, within which the markings are contained. Photo cells 1', on the other hand, are directed against the edge region of the band and thereby monitor the transverse position of the band as it moves along its lontitidinal direction. A single source of light 2 directs rays of light to the photo cells 1 and 1', through the lenses 3 and 3', respectively. After passing through the lenses, the light becomes reflected from the surface of the band 4, and impinges upon the respective photo cells.

Figure 5:
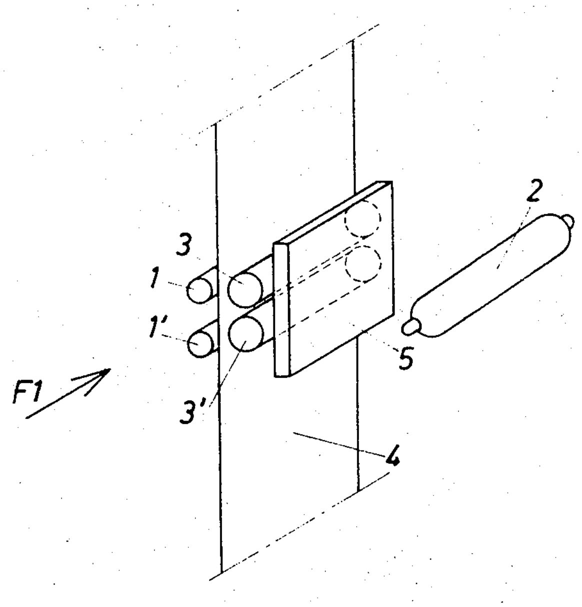
FIG. 5 is a view of the assembly of another embodiment of the invention with two cells for successive checking of a same position of the band.
Figure 6:
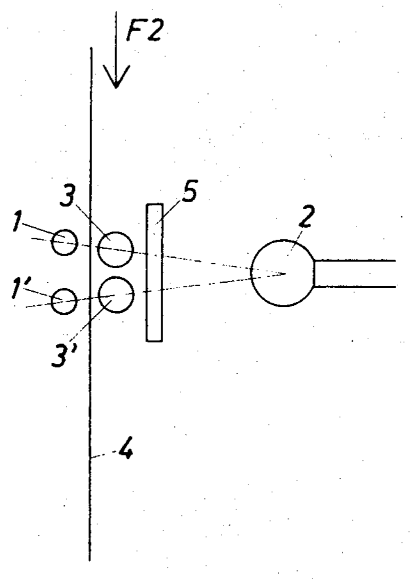
FIG. 6 is a lateral view along the arrow $F_1$ of the embodiment of FIG. 5 where the light rays, shown in intermittent lines, traverse a material of sufficient transparency on which the impression is checked.

In the embodiment of FIGS. 5 and 6, cadmium sulphide photoresistive cells 1 and 1' are located on one side of the band 4, whereas the light source 2 is located on the other side of the band. Light from the source 2 is transmitted through a heat-absorbing glass screen 5, and is formed into two concentrated beams of light through cyindrical lenses 3 and 3'. The light beams emerging from the lenses 3 and 3' are transmitted through the band 4 and impinge upon the photo cells 1 and 1'. The light source 2 is of the filament type, with axis parallel to the axes of the cylindrical lenses 3 and 3'. The band 4 is a continuously moving band with markings located thereon. The arrangement is such that the linear filament lamp 2, in combination with the cylindrical lenses 3 and 3', produces two concentrated beams of light of equal intensity onto the band as it moves continuousty past the stationary lenses 3 and 3' as well as the light source 2. The spacing of the photo cells 1 and 1' is such that when a marking on the band 4 moves past the photo cells, one cell receives a light beam which is modified or altered as a result of the marking on the band, whereas the other cells receive a light beam which is modified only as a result of the transparency characteristic of the band 4. Consequently, by connecting the photo cells 1 and 1' to a differential amplifier, it is possible to distinguish between the two signals derived from the photo cells, and thereby identify the characteristics of the markings on the band. A Wheatstone bridge or other conventional differential devices may be used in lieu of the differential amplifier for this purpose.

The sensitivity of the device can be adjusted to a maximum by spacing the photo cells 1 and 1' so that the photo sensitive elements of these cells are separated by a distance which is only slightly larger than the length of a marking on the band 4. In this manner, irregularities and non uniformities in the construction of the band do not affect the sensitivity of the arrangement, and the photo cells 1 and 1' will supply a distinguishing signal only when a marking does occur on the band 4. Consequently, by thus spacing the photo cells 1 and 1', the transparency characteristics of the material as well as any non-uniformities therein are compensated for, and no different signal between these two photo cells will be realized unless a marking does, in fact, appear on the band. In view of such high sensitivity of the arrangement, furthermore, the quality of the marking may also be readily inspected or monitored.

Figure 7:
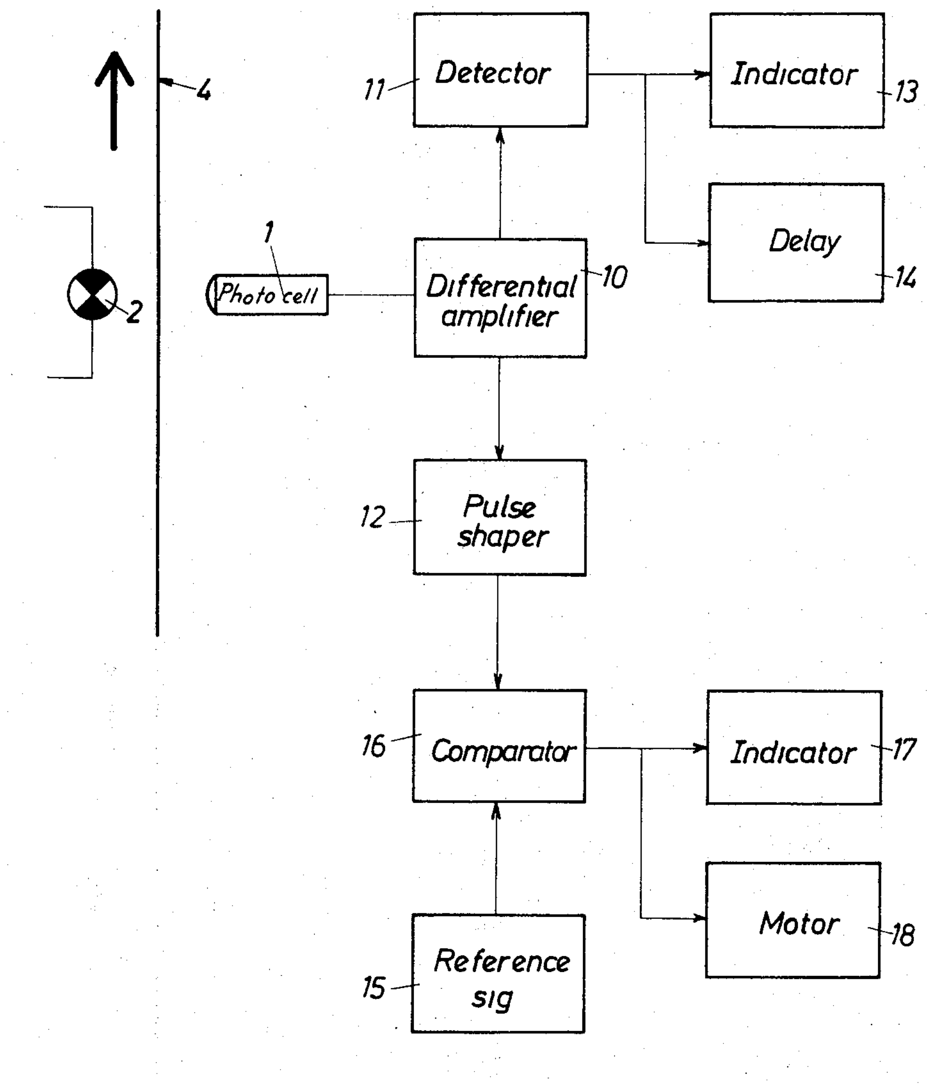
FIG. 7 is a schematic diagram of the monitoring arrangement used in conjunction with the detectors of FIGS. 1 to 6 for indicating and stopping machine operation in the event of occurrence of faulty markings.

Processing of these signals obtained from the photo cells is realized through the arrangement of FIG. 7. The pulse signals transmitted by the photo cells 1 and 1' are applied to a differential amplifier 10 which serves to amplify the difference in the amplitudes of the signals derived from the two groups of photo cells 1 and 1'. The output of the amplifier 10 is connected to a threshold detector 11 which processes the amplified pulse signals from the amplifier 10 or amplitude or level of the pulse. In the event that the amplitude or level of the pulse signals from the amplifier 10 is below a predetermined value or threshold, the threshold detector 11 actuates an indicator or signalling device 13 and a delay unit 14.

The indicating device 13 warns operating personnel of the condition of th deficiency in the marking on the band, and the delay unit 14 serves to stop furhter operation of the machine, in the event that the defect is not corrected within a predetermined amount of time. Thus, the dealy associated with the device 14 corresponds to the period of time allowed for correcting the defect in the marking by the operating personnel, before stopping of the machine entirely is necessitated. Thus, the threshold detector 11 may be used to inspect the markings for their quality of their intensity in color, for example. The output of the amplifier 10 is also applied to a pulse shaper 12, which shapes the applied pulse into one of relatigvely narrow form. The narrow impulses from the pulse shaper 12 are in turn, applied to a comparator 16. When the band or tape 4 travels at a predetermined velocity, and the marks are spaced along the longitudinal axis at predetermined distances from each other, a train of sequentially following pulses, therefore, will be applied by the shaper 12 to the comparator 16. The frequency of these pulses is dependent directly upon the velocity of the tape 4.

Thus, when the tape travels at a slower speed, the pulse repetition frequency of the pulses applied to the comparator 16 by the shaper 12, will be decreased. An increase in the longitudinal velocity of the tape, on the other hand, will be reflected in an increase in the frequency of occurrence of the pulses applied to the comparator from the shaper 12.

The signalling device 15 serves as a reference signal device which is connected to the other input of the comparator 16. The device 15 is connected or mechanically coupled to the machine so that whenever the machine executes a cycle of operation, such as applying a mark to the tape 4, a signal will be emitted by the device 15. In particular, the device 15 is coupled to that part of the machine which continuously carries out a cycle or operation at the desired instant of time. The device 15 consequently is a reference device which applies to the comparator 16, a reference signal.

The pulses applied to the comparator 16 by the reference signalling device 15 are narrow-shaped impulses which occur whenever a cycle of operation is to be correctly executed. Since the machine is a continuously operating unit, and since a pulse is applied by the device 15 to the comparator 16, whenever a cycle is correctly executed for a period of time, the pulses provided by the signalling device 15 will be equally spaced and have a predetermined pulse repetition frequency which is of a predetermined magnitude and which is directly related to the cycling speed of the machine, under the desired proper operation.

Since, in the embodiment of FIG. 7, a mark is to prevail in the light path of the photoelectric sensor 1, whenever a pulse occurs at the output of the signalling device 15, the pulses emitted by the shaper 12 are to have the same frequency as the pulses from the device 15. Thus, the occurrence of a pulse at the output of the device 15 coincides with the desired instant at which a mark is to be placed on the tape 4. Accordingly, under correct and proper operating conditions, the preiod between pulses emitted by the shaper 12 will be precisely equal to the period between pulses emitted by the device 15. The comparator 16 accepts the pulse trains from both the shaper 12 and the device 15, and compares the two pulse trains to determine whether the pulses from the device 15 coincide with the pulses emitted by the shaper 12.

Whenever a pulse from the device 15 coincides, in time, with a pulse applied to the comparator by the shaper 12, the comparator will provide no signal output. Under desired operating condition, therefore, the comparator will provide no output signal, since under such proper operating conditions, a pulse from the shaper will be applied to the comparator 16, at precisely the same instant of time that a pulse is applied to the other input of the comparator, by the signalling device 15. When, however, an undesired shift in operation occurs, and the pulses arriving at the comparator 16 from the shaper 12 do not coincide with the pulses emitted by the device 15, the comparator will provide an output to the indicator 17 and motor 18, since the pulses from the shaper 12 will not precisely cancel or nullify the pulses emitted by the device 15. Under these conditions, when improper operation of the system prevails, and a signal is provided at the output of the comparator 16, the indicating device 17 is actuated to notify operating personnel that such an improper operating condition prevails. At the same time, the comparator output signal is also applied to the motor 18, which in turn is used to adjust the driving or transport mechanism for the tape 4, so that the longitudinal speed of the tape will be modified to the extent that the pulses derived from the shaper 12 will coincide, in time, with the pulses emitted by the reference device 15. For example, a higher velocity of the tape 4 will result in a higher frequency of the pulses derived from the shaper 12 for a given spacing of the marks on the tape. Therefore, for a given or constant frequency of occurrence of pulses from the signalling device 15, an increased speed in the longitudinal tape 4 will result in a pulse train emitted by the shaper 12, which has a higher frequency than the pulse train derived from the reference signalling device 15. A substantial decrease in the velocity of the tape 4, on the other hand, will result in a pulse repetition frequency from the shaper 12, which is less than the frequency realized from the signalling device 15. consequently, by energizing the motor 18, from the output of the comparator 16, the motor may be made to modify the velocity of the tape 4, for example, so that the speed of that tape will precisely correspond to the desired speed as reflected by the pulse train derived from the device 15.

Once the correct speed of the tape 4 has been attained, the pulse train from the shaper 12 will coincide precisely with the pulse train from the reference device 15, and the comparator will no longer apply an energizing signal to the motor 18 for the purpose of modifying the speed of the tape. In this manner, therefore, the correct speed of the tape may be obtained through the control loop of the shaper 12, reference signalling device 15, comparator 16 and motor 18.

While the invention has been described and illustrated with respect to certain preferred examples which give satisfactory results, it will be understood by those skilled in the art after understanding the principle of the invention, that various changes and modifications may be made without departing from the spirit and scope of the invention.

What is claimed is:

1. A process of checking on a continuously moving band having an area provided with regularly spaced marks in the direction of the movement of said band, a characteristic of said marks being position, depth of impression and presence thereof, said process comprising the steps of directing light to a first local zone of said area of said band and to a second local zone of said band so near to said first local zone that when one of said marks is located on said first zone there is no mark on said second local zone, sensing the light received from said first and second local zones to produce two independent electrical signals, said signals being substantially identical when no mark is present on said first zone and being substantially different when a mark prevails on said first zone, comparing said two signals, producing a third signal which is the difference between the signals relaized from the light passing through a mark on said first zone and light passing through said unmarked second zone, and said third signal being indicative of the condition when the depth of impression and presence of said marks differs from a predetermined depth of impression and presence.

* * * * *

UNITED STATES PATENT OFFICE
CERTIFICATE OF CORRECTION

PATENT NO. : 3,777,166

DATED : December 4, 1973

INVENTOR(S) : Raymond Poupin

It is certified that error appears in the above-identified patent and that said Letters Patent are hereby corrected as shown below:

In the heading of the patent insert -- Claims priority from French patent applications PV 28551, filed August 17, 1965 and PV 39855, filed November 26, 1965 --

Signed and Sealed this

*Twenty-eighth* Day of *February 1978*

[SEAL]

*Attest:*

RUTH C. MASON
*Attesting Officer*

LUTRELLE F. PARKER
*Acting Commissioner of Patents and Trademarks*